May 9, 1939.  R. L. GRANT, JR  2,158,008
BEAM TESTING MACHINE
Filed March 25, 1937
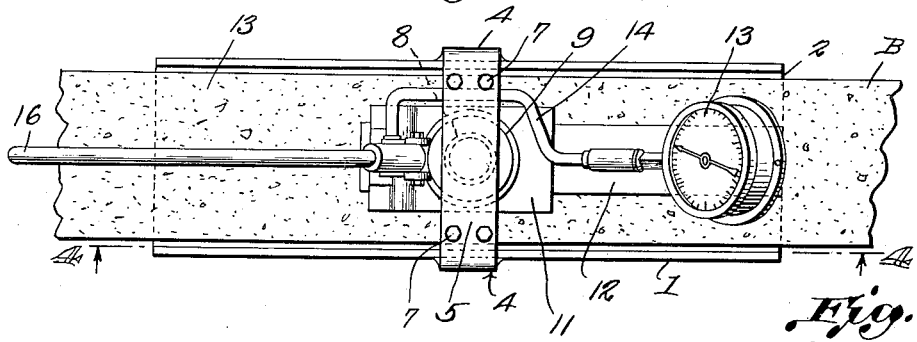
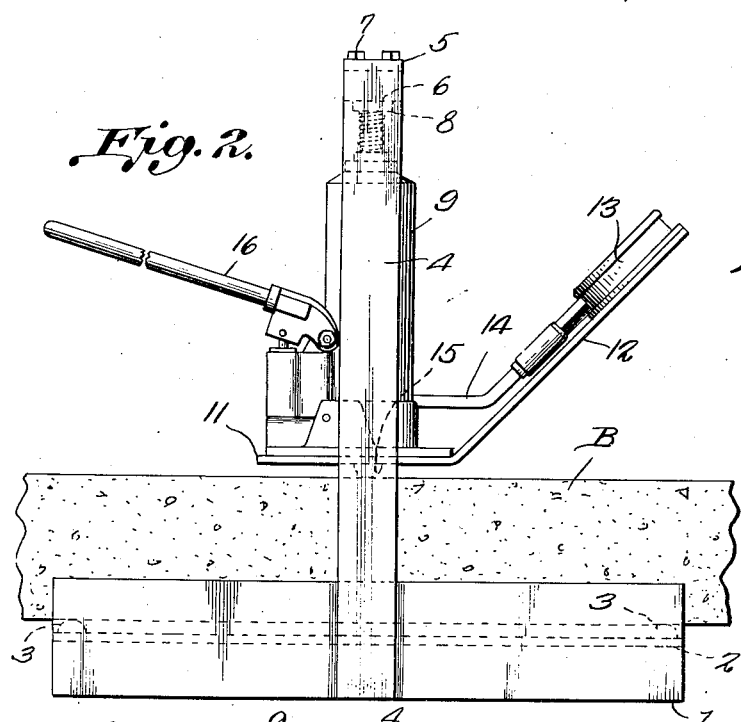 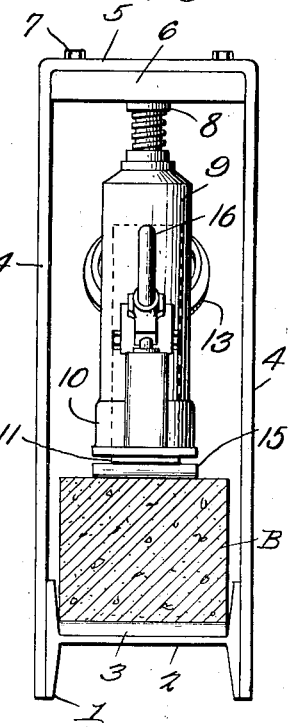
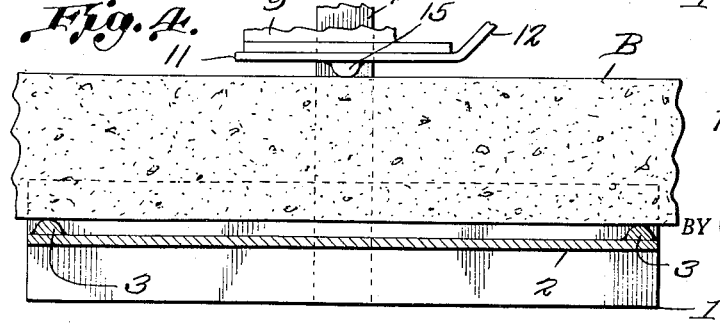
Robert L. Grant, Jr.,
INVENTOR.
BY
ATTORNEYS.

Patented May 9, 1939

2,158,008

UNITED STATES PATENT OFFICE 2,158,008

BEAM-TESTING MACHINE

Robert Lawton Grant, Jr., Atlanta, Ga.

Application March 25, 1937, Serial No. 133,045

1 Claim. (Cl. 265—14)

This invention relates to a beam testing machine designed particularly for the transverse testing of concrete beams for modulus of rupture determinations.

Different types of machines have been perfected for testing beams but, as a general rule, they are heavy and cumbersome and therefore difficult to transport. Furthermore they have been made of several parts which must be assembled before the machine can be used and as the machine must be constantly on the job, these parts frequently become lost or misplaced so that progress of work is hampered.

It is an object of the present invention to provide a testing machine for the purpose stated which can be carried readily by one man and which comprises only two major parts.

It is a further object to provide a testing machine which is simple, durable and compact and the weight of which is such that the entire device can be readily carried by one person.

It is also an object of the invention to provide a machine which can be operated easily for the purpose of testing a beam.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1 is a plan view of the machine, a portion of a concrete beam being shown positioned therein for testing.

Figure 2 is a front elevation of the structure shown in Figure 1.

Figure 3 is a side elevation, the concrete beam being shown in section.

Figure 4 is a vertical, longitudinal section through a portion of the structure, said section being taken on the line 4—4, Figure 1.

Referring to the figures by characters of reference 1 designates the base of the machine which is formed of a short length of I-beam the flange portion 2 of which is disposed horizontally, as shown particularly in Figure 3 and is provided, adjacent to its ends, with bars 3 welded or otherwise joined to the upper surface of the web and constituting spaced bearings, these bearings being parallel and at right angles to the sides of the beam.

A yoke 4 straddles the central portion of the base 1 and has its ends welded or otherwise joined thereto so that this yoke is an integral part of the beam and overlies the center of it.

The top portion or head of the yoke, indicated at 5 is reenforced by a bar 6 secured thereunder by screws 7 and this bar constitutes a thrust bearing for the head 8 of a hydraulic jack 9 which can be of any preferred construction. The base 10 of the jack is secured to a plate 11 having an extension 12 on which is mounted a pressure gage 13 of any standard construction, this gage being joined to the jack by a tube 14, as will be obvious.

Extending downwardly from the plate 11 in line with the axial center of the jack is a transverse bearing bar 15 welded or otherwise joined to the plate and adapted to extend transversely of a concrete beam while being tested. The operating lever of the jack has been indicated at 16.

From the foregoing description it will be noted that the entire apparatus is made up of but two members, namely the base 1 and its upstanding yoke and the hydraulic jack 9 with the parts joined thereto. These members can be carried readily by one man because they are comparatively light in weight.

When it is desired to use the apparatus, the concrete beam B to be tested is placed on the base so as to rest upon the bearings 3 and between the flanges of the base. The hydraulic jack 9 is then interposed between the top of yoke 4 and the beam so that the bearing 15 will rest upon the beam B and extend transversely thereof at a point equidistant from the two bearings 3. The jack is then actuated to exert a downward thrust against the beam through bearing 15 and the amount of pressure applied will of course be disclosed by the indicator 13. After the beam has been tested and removed, the jack can be withdrawn from the yoke 4 and the two members of the apparatus readily carried to any other point where another test is to be made. The rapidity with which the apparatus can be set up and used and the ease with which it can be transported, renders it particularly useful in connection with construction jobs.

It will be noted that during the application of pressure the force exerted by the jack is transmitted to the base 1 which is mounted solidly on the ground or other supporting surface and to the top or head of the yoke 1 which is an integral part of the base. There are no joints, links or other moving parts to be subjected to strain and which are likely to become broken or sheared off. Furthermore the three bearing points are always correctly positioned when the two members are assembled.

What is claimed is:

A portable testing machine including an I-beam constituting a base adapted to be mounted on a supporting surface, said beam being normally positioned with its web horizontal, transverse bearings integral with the web and equally spaced from the center thereof, a yoke integral with the base and straddling and extending transversely of the central portion thereof, a jack interposed between the intermediate portion of the yoke and the base, a plate joined to the base of the jack for carrying an indicator, and a transverse bearing depending from the plate and positioned to engage one surface of a beam under test at a point equidistant from the bearings on the base and within the yoke while said bearings are engaged by the opposed surface of the beam.

ROBERT LAWTON GRANT, Jr.